March 24, 1970 — O. L. WELKER — 3,502,922

LAMINATED STATOR CORE STRUCTURE

Filed March 14, 1968

INVENTOR.
OSCAR L. WELKER
BY Wolfe, Hubbard,
Voit & Osann
ATTORNEYS

United States Patent Office 3,502,922
Patented Mar. 24, 1970

---

3,502,922
LAMINATED STATOR CORE STRUCTURE
Oscar L. Welker, Rockford, Ill., assignor to Barber-Coleman Company, Rockford, Ill., a corporation of Illinois
Filed Mar. 14, 1968, Ser. No. 713,102
Int. Cl. H02k 17/10
U.S. Cl. 310—172                            15 Claims

ABSTRACT OF THE DISCLOSURE

A reversible shaded-pole electric motor having a laminated stator core composed of a plurality of laminations of generally rectangular shape each formed by two U-shaped parts having leg sections fitted together in end-to-end relation, one set of leg sections being arcuately recessed to define a rotor recess and longitudinally slotted to receive two shading coils on each side of the rotor. The field coil is telescoped onto the leg formed by the other two leg sections and locked together by a tongue-and-groove joint centered in the field coil. The two types of parts are arranged and secured together in stacks that are identical except at the joint, and the stacks are moved together into the coils and pressed into interlocked relationship, the bridges around the rotor recess having effective air gaps on the plane of symmetry of the core formed by the abutting ends of the core-leg sections. Conventional end plates, bearings, a rotor and a shaft are mounted on the core.

BACKGROUND OF THE INVENTION

This invention relates to the construction of electric motors and, more particularly, to the construction and assembly of laminated stator cores as used in shaded-pole motors of the type having a rotor journaled for rotation in a cylindrical recess in the core between stator poles on opposite sides of the recess, a field coil telescoped onto one leg of the core to produce flux in the core and through the rotor when alternating current is applied to the coil, and so-called shading coils mounted on the poles to cause the magnetic field to revolve around the rotor and thus produce starting torque in a manner well known in the art. When the motor is to be reversible, two sets of shading coils are provided, each set comprising one coil on each pole, and a selected set is short-circuited to cause the motor to rotate in a selected direction.

One such motor that has been manufactured for many years is shown in Patent No. 2,010,869 wherein it will be seen that the stator core comprises a plurality of laminations each composed of two separately formed dissimilar parts arranged in edge-to-edge relation to form a first leg for supporting the field coil and a second leg defining the rotor recess and supporting the shading coils, alternate laminations having the two parts reversed to form lapped joints at the corners of the stator. While motors with such stators have performed satisfactorily through the years, the assembly of the cores has been a time-consuming, and therefore expensive, operation requiring individual handling of each lamination.

SUMMARY OF THE INVENTION

The general object of the present invention is to improve the construction of the stator core of shaded-pole motors, and particularly reversible motors, by forming the parts of the laminations for arrangement in two stacks adapted to be secured together prior to assembly and then assembled as units in a single and simple operation into the remainder of the stator structure including the four shading coils and the field coil. Another object is to position the joints between the two stacks in the magnetic circuit in a novel manner both to minimize or eliminate imbalance in the flux in the two halves of the core by making permeance in the two halves bilateral, and to linearize the relation between the flux in the shading coils and the magneto-motive force by suppressing the generation of harmonics. A further object is to construct the two parts of each lamination for assembly of the stator structure simply by pressing the two stacks together within the tre-spective coils and into interlocked relation. Still another object is to improve the stacking factor or compactness of the core for improved performance.

Other objects and advantages will become apparent from the following detailed description, taken in conjunction with the accompanying drawings.

DETAILED DESCRIPTION

Figure 1:
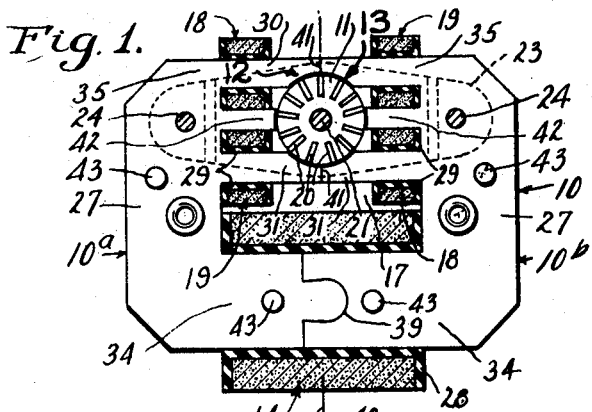
FIGURE 1 is a cross-sectional view of a reversible shaded-pole motor embodying the novel features of the present invention, the view being taken in a plane perpendicular to the motor axis along one end of the stator core, as indicated by the line 1—1 of FIG. 2.

As shown in the drawings for purposes of illustration, the invention is embodied in a reversible shaded-pole electric motor of the type having a generally rectangular laminated core 10, a rotor 11 journaled in a cylindrical recess in the core for rotation between the two poles 12 and 13 formed by the wall of the recess on opposite sides of the rotor, and a field coil 14 telescoped onto one leg of the core on one side of (herein beneath) a central rectangular opening 17 through the core to produce the magnetic field in the core. In addition, two sets of shading coils 18 and 19 are mounted on the poles 12, 13 and operable in pairs to shade or suppress a component of the field in order to cause the latter to revolve around the rotor and produce starting torque.

Figure 2:
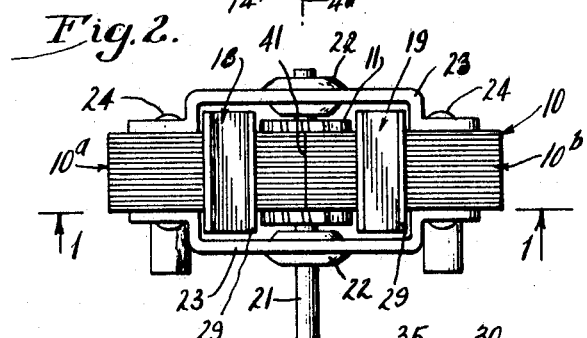
FIG. 2 is a plan view of the motor shown in FIG. 1.

Herein the rotor 11 comprises a cylindrical core carrying a plurality of conducting bars 20 that are fitted in peripheral slots equally spaced around the core and are connected by conducting disks at the ends. The rotor shaft 21 is journaled adjacent its ends in bearings 22 (FIG. 2) supported by non-magnetic end plates 23 which are secured to the opposite ends of the stator core 10 by rivets 24, thus supporting the rotor for free rotation between the poles 12 and 13. It will be seen that the laminated core 10 comprises, in addition to the field-coil leg, a parallel leg defining the rotor recess and the poles 12 and 13, and two connecting bars 27 along the sides of the core, thereby completing the generally rectangular shape around the central recess 17. The field coil 14 is of conventional form and comprises a larger number of turns of wire wound on a spool 28 that is disposed around the field-coil leg and the shading coils 18, 19 similarly are wound on spools 29 telescoped onto the supporting bars 30 and 31 constituting inner and outer portions of the pole leg on opposite sides of the rotor 11. To form these bars, inner and outer slots 32 and 33 extend into the leg from each pole, longitudinally of the leg, a distance greater than the axial length of the coils 12, 19 which are telescoped onto the bars so that the outer coil on each pole extends through the outer slot and around the outer side of the bar 30, while the inner coil extends through the inner slot and around the inner bar 31 through the central recess 17. Each coil thus is positioned to shade a selected portion of the associated pole in a conventional manner.

For this purpose, either the coils 18 or the coils 19 are connected in series in a closed shorting circuit (not shown) while the circuit for the other pair of coils is left open to deactivate the open coils. In this way, current is derived by induction in the active shading coils as a result of the flux in the core passing through the bridges formed by the portions 30, 31 of the leg extending across the inner and outer sides of the rotor recess. When the exciting voltage is applied to the field coil 14, the alternating current produced in the coil creates a magnetic field in the core with lines of flux extending through the rotor recess and intersecting the conductors 20 to induce alternating current therein by transformer action, and the interaction of this current with the stator field produces a pulsating field that may be resolved into equal forward and reverse components. When the shading coils 18 are short-circuited and thus activated, the flux in the area of the poles 12, 13 shaded by these coils is reduced in magnitude and caused to lag in time phase relative to the flux in the unshaded pole areas, thus causing the rotor 11 to rotate clockwise as viewed in the drawings. In a similar way, counterclockwise rotation results when the coils 19 are short-circuited and the circuit of the coils 18 is opened.

The foregoing is in accordance with conventional practice and is included herein to facilitate an understanding of the invention with respect to the configuration of the novel laminated core 10 in which each lamination is composed of two separate parts 10$^a$ and 10$^b$ capable of being arranged in two stacks each made up of identical parts and secured together prior to assembly of the core structure, and then pressed together in a single operation in which the four shading coils 18, 19 and the field coil 14 are properly placed on the core. In addition, the joints between the two stacks of parts are positioned in the magnetic circuit to avoid imbalance in the flux in the two sides of the circuit, and also to suppress the generation of harmonics in the area of the bridges 30, 31 thereby to linearize the relation between the magneto-motive force and the flux in the shading coils. Accordingly, the novel core and stator structure not only are more easily assembled but also improve the performance of the motor.

To these ends, each lamination part 10$^a$, 10$^b$ is generally U shaped with two leg sections 34 and 35 (see FIG. 3) joined by a connecting bar 27, and the free ends of the sections 35 are formed with arcuate recesses 37 which cooperate to define a circular recess when the ends are butted together. On the free ends of the leg sections 34 are two interfitting elements 38 and 39 of a press-locking joint movable into interlocked relation as the two stacks are moved toward each other to bring the free ends of the four leg sections into abutting relation, all of the coils being assembled as an incident to this movement of the stacks together. To avoid imbalance in the circuit, both joints between the four leg sections are centered on the plane of symmetry 40 (FIG. 1) of the stator core 10, and the locking joint between the sections has an interference fit and is centered within the field coil 14 in the area of maximum magneto-motive force of the coil to maintain symmetrical leakage flux paths for uniform operating characteristics in both directions of rotation. Finally, the butt joint 41 between the leg sections 31 and 32 intentionally produces effective air gaps of higher reluctance than that of the saturable bridges so that the reluctance of the interrupted bridges remains substantially linear to avoid the generation of harmonics that are non-productive with respect to motor output.

In this instance, the two parts 10$^a$, 10$^b$ of each lamination are identical except for the configuration at the free ends of the leg sections 34 forming the interference joints 38, 39. The leg sections 35 are wider than the diameter of the rotor recess by the combined width of the bridges 30 and 31 at the joint 41, and each arcuate recess 37 is a semi-circle interrupted by the two slots 32, 33 which divide the leg section into a three-pronged configuration, the inner and outer prongs constituting the bars 30 and 31 in end-to-end abutting relation and the intermediate prongs 42 having ends spaced apart to lie closely adjacent the periphery of the rotor 11 on the arc of curvature of the interrupted wall of the recess, thus forming the central portions of the two poles 12 and 13.

The bridges are carefully designed to have the proper cross-sectional area for optimum motor performance. It is well known in the art that the area of the bridges determines the amount of the total available flux that flows through the shading coils 18 and 19 to induce the currents therein necessary to develop starting torque, and thus determines the amount of flux that passes through the rotor recess to drive the rotor 11. In prior reversible shaded-pole motors, such as that described in the aforesaid patent, the bridges have been made as continuous strips, sometimes with drilled or punched holes for increasing the reluctance of the bridges. The remaining saturable iron path of low reluctance, however, had a non-linear flux versus magneto-motive force characteristic resulting in the generation of harmonics as high as the seventh. These harmonics did not contribute to the motor torque and, in fact, reduced efficiency of the motor. With the joint 41 formed by the abutting end surfaces of the two leg sections 35 of the laminations, the irregularities in the abutting surfaces produce effective air gaps of higher reluctance which maintain the flux versus magneto-motive force characteristic more linear as the bars 30, 31 saturate and thus reduce objectionable harmonics.

Figure 4:
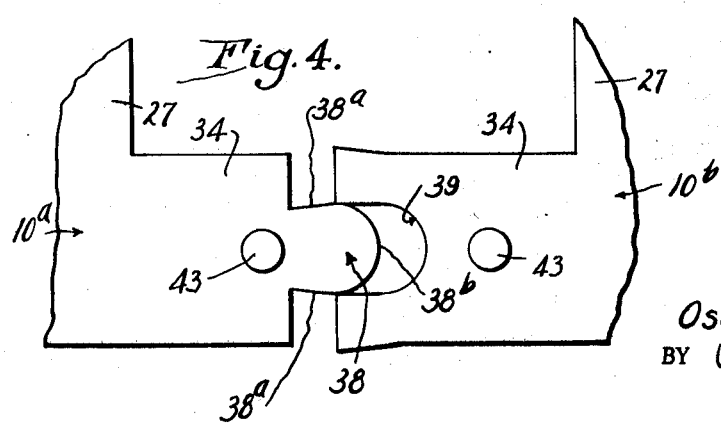
FIG. 4 is an enlarged fragmentary view showing the conditions of part of the core structure as the two stacks are pressed into assembled relation.

The joint 38, 39 between leg sections 34 is of the tongue-and-groove or dovetail type, the element 38 on each part 10$^a$ being made up of tabs projecting longitudinally to the right and the element 39 being made up of complementary notches alined with the tabs to receive the latter as the leg sections are moved endwise together. It will be seen in FIG. 4 that each tab is defined by edges 38$^a$ diverging to a maximum separation and then merging smoothly with a curved end 38$^b$. Similarly, the notch 39 is defined by edges that diverge from the mouth of the notch toward the closed end and then merge with the arcuate end of the notch. The mouth thus is narrower than the maximum width of the tab and is spread to some extent as the tab is forced into the notch, recovering as a result of the resilience of the metal to clamp the tab in place. The two joint elements of each lamination are dimensioned to fit tightly together in the final assembly and eliminate, to the greatest practical extent, any clearance between opposed surfaces.

As shown in FIG. 1, the abutting end surfaces of the leg sections 34 are offset to the left from the plane of symmetry 40 of the stator core 10 so that the tab 38 and the notch 39 of each lamination are centered on this plane. This distributes the imbalancing effect of the joint equally on opposite sides of the plane, by distributing the gap and its effect on the permeance of the circuit on opposite sides of the plane, and thus virtually eliminates imbalance. In addition, the joint is centered within the field coil 14 where the field strength is greatest and is capable of overcoming any tendency of the relutance of the joint to imbalance the flux in the core. Accordingly, the magnetic field and any leakage flux are symmetrical on both sides of the plane for uniformity of forward and reverse operation and freedom from a tendency to run single-phase when both pairs of shading coils 18, 19 are open.

To produce a stator structure including the laminated core 10, the parts 10$^a$ and 10$^b$ of the laminations first are fabricated from relatively thin sheet stock, typically by a punching operation all parts of each type being identical to each other. Then a plurality of each type of parts are arranged in side-by-side relation to form two stacks each having the number of layers desired in the assembled core, and each stack is secured together by two or more fasteners such as the rivets 43 shown in FIG. 3. The tabs 38 on the stack of parts 10ª cooperate to form a tongue extending across the full thickness of the stack, while the notches 39 on the parts 10ᵇ cooperate to define a complementary groove of the same length as the tongue.

Figure 3:
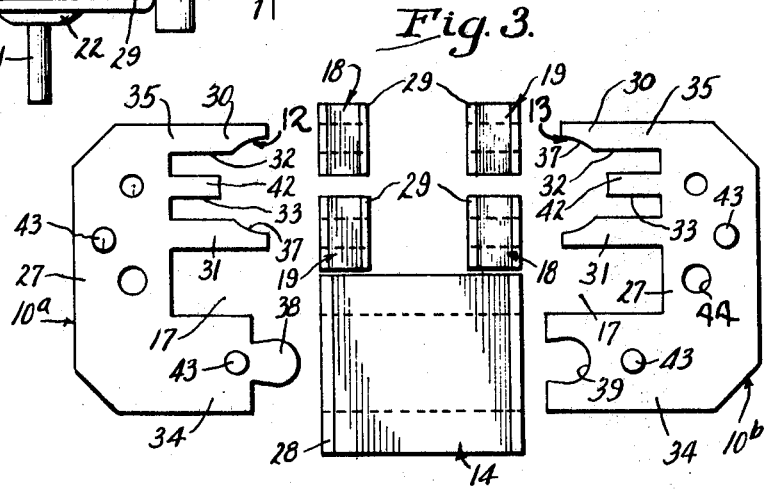
FIG. 3 is an exploded side elevational view showing the relationship of the stacks of laminations to the field and shading coils prior to assembly of the stator structure.

As shown in FIG. 3, the four shading coils 18, 19 and the field coil 14 are arranged in a suitable fixture (not shown) in the same relative positions that they occupy in the final stator structure, and the two stacks of lamination parts 10ª, 10ᵇ are positioned on opposite sides of the fixture with the outer bars 30 alined with the outer two shading coils and the inner bars 31 alined with the inner two shading coils, the leg sections 34 of the two stacks thus being alined with the opposite ends of the field coil 14. Set up in this manner, the stacks are movable as units toward each other, into the respective coils, and into assembled relation by a press (not shown) capable of forcing the tongue on one stack through the restricted mouth of the groove in the other stack. At the same time, this brings the ends of the pole leg sections 35 into abutting relation at the joint 41.

When the clamping pressure is released, the interference fit between the tongue and the groove prevents the two stacks from pulling apart. All that remains to complete the assembly of the motor is the insertion of the rotor 11 in the rotor recess, and the attaching of the end plates 23 to the core with the rivets 24 on opposite sides of the recess. It will be seen that these end plates serve to tie the core together across the recess. Two holes 44 are provided on opposite sides of the recess for attachment of mounting posts.

Figure 5:
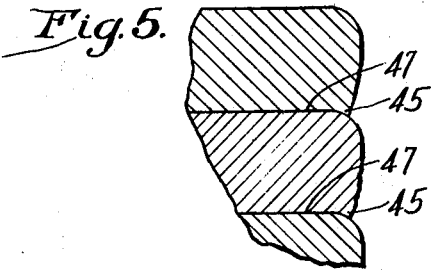
FIGS. 5 and 6 are enlarged fragmentary cross-sectional views taken through one of the stacks and respectively illustrating the preferred way to stack the laminations for a high stacking factor and the opposite way the laminations may be stacked.
Figure 6:
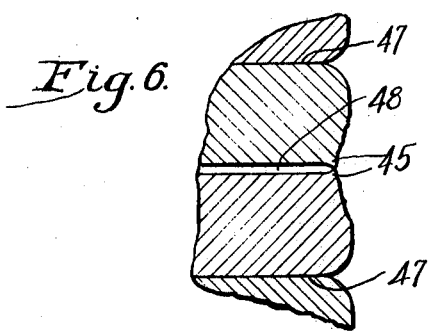

One additional advantage of this type of laminated core, as compared to the type illustrated in the aforesaid patent, is the increase in the stacking factor or density of the core resulting from the identity of the parts in each stack. These parts are punched in the same direction from the basic sheet stock so that the burrs 45 (FIGS. 5 and 6) produced by the punching operation along the edges of the parts extend in the same direction. When the parts are stacked, these burrs "nest" snugly around the burr-free side 47 of the adjacent part to minimize air gaps in the stack, whereas the burrs of the alternating dissimilar laminations of the aforesaid patent opposed each other, as illustrated in FIG. 6, to leave gaps as at 48 which reduced the density of the core. As a result of the higher stacking factor it is possible to increase the volume of metal in a laminated core of given size by including one or more additional laminations.

From the foregoing, it will be evident that a stator structure including the laminated core 10 may be assembled simply by arranging the two types of lamination parts in stacks, securing the parts in each stack together, and then pressing the stacks together and simultaneously into the five coils 14, 18, 19, to complete the assembly operation in an inexpensive, mass-production operation. At the same time, the two stacks preferably are identical, except for the interlocking joint 38, 39 which is centered within the field coil in the zone of highest magneto-motive force. Thus, the core, in its preferred form, is virtually symmetrical when assembled, for uniformity of forward and reverse operating characteristics and elimination of imbalance when both shading coil circuits are open, and an added advantage is obtained by utilizing the butt 41 joint in the coil leg to linearize the reluctance of the bridges while maintaining the symmetry of the circuit.

I claim as my invention:

1. A reversible shaded-pole electric motor having, in combination, a laminated stator core comprising a plurality of laminations of generally rectangulad shape each composed of first and second separately formed, generally U-shaped parts having first leg sections abutting against each other in end-to-end relation to form a field-coil leg extending across one side of said core, said parts also having second leg sections extending across the other side of said core in spaced, parallel relation with said first leg sections and abutting in end-to-end relation to form a pole leg, the abutting ends of said second sections having semi-circular recesses therein cooperating to define a circular rotor recess, and two slots extending longitudinally of said second leg sections from each of said walls into the second leg section to divide the latter into inner, outer and intermediate bars, said inner and outer bars having substantially straight abutting edge surfaces lying on and extending along the plane of symmetry of said core and defining bridges interrupted by effective air gaps formed between said abutting surfaces; a rotor journaled for rotation in said rotor recess; a field coil in telescoped relation with said field-coil leg; four shading coils in telescoped relation with said inner and outer bars; fasteners securing all of said first parts together in a first stack and all of said second parts together in a second stack independent of said first stack; said stacks being identical to each other outside said field coil; and interlocking elements on said first leg sections centered within said field coil and engageable with an interference fit as an incident to insertion of said first leg sections endwise into the field coil from opposite ends thereof, thereby to lock said stacks together with the respective leg sections in end-to-end abutting relation.

2. In a reversible shaded-pole electric motor, a laminated stator structure comprising a core having a plurality of laminations composed of first and second separately formed generally U-shaped parts having first leg sections abutting against each other in end-to-end relation and forming a field-coil leg extending across one side of the core, said parts having second leg sections parallel to said first sections abutting against each other in end-to-end relation to form a pole leg extending across the opposite side of said core, the abutting ends of said second leg sections having semi-circular walls cooperating to define a circular rotor recess between said parts and each having two slots extending longitudinally into the leg from said walls to divide the leg section into inner, outer and intermediate bars with the inner and outer bars of the two sections in end-to-end abutting relation with the abutting ends lying on and extending along the plane of symmetry of said core and the intermediate bars spaced apart across said recess, and cooperating locking elements on the abutting ends of said first leg sections shaped for movement into interlocking relation as an incident to movement of said first leg sections endwise toward each other; a field coil telescoped onto said field-coil leg over said locking elements; and four shading coils telescoped onto said inner and outer bars for operation in pairs.

3. A laminated stator structure as defined in claim 2 further including means securing said first parts together in a first stack, means securing said second parts together in a second stack independent of said first stack, said stacks being identically shaped except within the central portion of said field coil.

4. A laminated stator structure as defined in claim 3 in which said locking elements form a tongue-and-groove joint centered within said field coil and on the plane of symmetry of said core.

5. In a shaded-pole electric motor, a laminated stator structure comprising a core having a plurality of laminations composed of first and second separately formed generally U-shaped parts having first leg sections abutting against each other in end-to-end relation and forming a field-coil leg extending across one side of the core, said parts having second leg sections abutting against each other in end-to-end relation to form a pole leg extending across the opposite side of said core, the abutting ends of said second leg sections having semi-circular walls cooperating to define a circular rotor recess between said parts and having slots extending longitudinally into said leg from said wall and forming supporting bars for receiving shading coils and supporting the coils adjacent selected portions of said walls, and cooperating locking elements on the abutting ends of said first leg sections shaped for movement into interlocking relation as an incident to movement of said first leg sections endwise toward each other; a field coil telescoped onto said field-coil leg over said locking elements; and shading coils telescoped onto said bars and positioned thereon to shade the magnetic field of said motor adjacent said selected portions.

6. A laminated stator structure as defined in claim 5 further including means securing said first parts together in a first stack and securing said second parts together in a second stack independent of said first stack whereby said stacks are movable independently as units toward each other to move said leg sections into said coils and bring said elements into interlocking relation.

7. A laminated stator structure as defined in claim 6 in which said first and second parts are identical to each other except adjacent said locking elements, each second leg section having two slots and two shading coils and abutting against the other second leg section in the plane of symmetry of the core along the inner and outer sides of said recess to form bridges having effective air gaps in said plane.

8. A laminated stator structure as defined in claim 7 in which said cooperating locking elements comprise a longitudinally extending tongue on the ends of a set of said first leg sections and a longitudinally opening groove in the ends of the other set of said first leg sections, said tongue and said groove being centered on said plane and in said field coil.

9. In a shaded-pole electric motor, a laminated stator structure comprising a core having a plurality of laminations composed of first and second separately formed parts having first leg sections abutting against each other in end-to-end relation and forming a field-coil leg extending across one side of said core and second leg sections abutting against each other in end-to-end relation to form a pole leg extending across the opposite side of said core parallel to said field-coil leg, the abutting ends of said second leg sections having arcuate walls cooperating to define a circular rotor recess and having abutting edge portions forming bridges on the inner and outer sides of said recess with effective air gaps formed between the abutting edges for preventing saturation of the bridges and generation of harmonics therein, and said second leg sections also having slots therein extending from said walls longitudinally into said sections for receiving shading coils and supporting the coils adjacent selected portions of said walls; means securing all of said first parts together in a first stack; means securing all of said second parts together in a second stack independent of said first stack; a field coil telescoped onto said field-coil leg over the abutting ends of said first section; shading coils fitted into said slots; and means on said stacks for locking them together as an incident to movement of the stacks toward each other longitudinally of said legs and movement of said leg sections into the respective coils.

10. A laminated stator structure as defined in claim 9 in which said locking means comprise tongue-and-groove elements on said first leg sections interfitting with an interference fit in the central portion of said field coil.

11. A laminated stator structure as defined in claim 9 in which said parts have burrs along corresponding edges and are nested together with the burrs of each stack on the same sides of the parts forming the stack.

12. A laminated stator structure as defined in claim 10 in which said stacks are identical except within the central portion of said field coil, each second leg section having two of said slots and supporting two shading coils for reversible operation of said motor, and said edge portions terminating in surfaces being located on the plane of symmetry of said core.

13. A laminated stator core structure for a shaded-pole electric motor composed of two substantially identical stacks of laminations defining a rotor recess, bridges on opposite sides of said recess and a leg for supporting a field coil on said core, the laminations of said stacks being independently fastened together and abutting against each other in a substantially straight line lying in and extending along a plane of symmetry centrally dividing said recess and said bridges and having an interlocked joint in said leg centered on said plane.

14. A stator structure for a reversible shaded-pole electric motor having shading coils mounted on a laminated core defining a cylindrical rotor recess, said core having bridges on opposite sides of said recess for carrying flux through said shading coils and being composed of two stacks of laminations abutting against each other in edge-to-edge relation on opposite sides of said recess and forming said bridges with effective air gaps formed between the abutting edges for preventing saturation of the bridges and generation of harmonics therein.

15. A stator structure as defined in claim 14 in which said air gaps lie on a central plane through said recess.

References Cited

UNITED STATES PATENTS

| | | | |
|---|---|---|---|
| 1,949,968 | 6/1934 | Lilja | 310—172 |
| 2,047,487 | 7/1936 | O'Leary | 310—172 |
| 2,064,090 | 12/1936 | Sullivan | 310—172 |
| 2,111,934 | 3/1938 | Liner | 310—172 |
| 2,123,182 | 7/1938 | Drake | 310—172 |
| 3,370,189 | 2/1968 | Haydon | 310—172 |

MILTON O. HIRSHFIELD, Primary Examiner

R. SKUDY, Assistant Examiner

U.S. Cl. X.R.

310—217, 258